United States Patent [19]
Boehler

[11] Patent Number: 5,891,498
[45] Date of Patent: Apr. 6, 1999

[54] BARBECUE GRILL SMOKER ATTACHMENT AND METHOD OF SMOKING FOOD PRODUCTS

[76] Inventor: Harold J. Boehler, 7205 Trinklein Rd., Saginaw, Mich. 48609-5354

[21] Appl. No.: 974,487

[22] Filed: Nov. 19, 1997

[51] Int. Cl.$^6$ .............................. A23B 4/00; A47J 37/00
[52] U.S. Cl. ........................ 426/314; 99/340; 99/447; 99/448; 99/482; 126/9 R; 126/25 R; 126/41 R; 426/315; 426/523
[58] Field of Search .................... 426/523, 314, 426/315; 126/9 R, 25 R, 41 R; 99/340, 352, 447, 448, 467, 482

[56] References Cited

U.S. PATENT DOCUMENTS

| | | | |
|---|---|---|---|
| 2,608,190 | 8/1952 | Winning et al. | 126/25 R |
| 3,224,357 | 12/1965 | Rubens | 126/25 R |
| 3,472,151 | 10/1969 | Cox | 99/340 |
| 3,586,518 | 6/1971 | Folmar | 99/482 |
| 4,094,295 | 6/1978 | Boswell et al. | 126/25 R |
| 4,374,489 | 2/1983 | Robbins | 126/41 R |
| 4,512,249 | 4/1985 | Mentzel | 126/25 R |
| 4,721,037 | 1/1988 | Blosnich | 126/25 R |
| 4,962,696 | 10/1990 | Gillis | 126/25 R |
| 5,096,727 | 3/1992 | Crace | 426/314 |
| 5,167,183 | 12/1992 | Schlosser et al. | 126/25 R |
| 5,195,423 | 3/1993 | Beller | 126/25 R |
| 5,242,703 | 9/1993 | Stewart | 426/523 |
| 5,528,984 | 6/1996 | Saurwein | 126/25 R |
| 5,564,330 | 10/1996 | Nowicke, Sr. | 126/25 R |

*Primary Examiner*—George Yeung
*Attorney, Agent, or Firm*—Reising, Ethington, Learman & McCulloch, PLLC

[57] ABSTRACT

The smoking attachment for use with a barbecue grill has a smoker box with a solid bottom plate, left and right side walls, a rear wall, a top, an open front and two doors that close and substantially seal the smoker box. Support brackets on the side walls support the smoker box on a grill box with the solid bottom plate above a grill heat source. A smoker box divider plate divides the smoker box into a wood chip chamber and a smoking chamber. A wood chip box holds wood chips and sets inside the wood chip chamber. Tray and rack holders support racks and trays with food products in the smoking chamber. Smoke from the wood chips passes through smoke passages in the smoker box divider plate and through smoke passage apertures in the tray and rack holders. Vertical smoke baffles on the tray and rack holders control the distribution of heat and smoke.

10 Claims, 3 Drawing Sheets

5,891,498

BARBECUE GRILL SMOKER ATTACHMENT AND METHOD OF SMOKING FOOD PRODUCTS

TECHNICAL FIELD

This invention relates to a barbecue grill smoker attachment for smoking and cooking food products and more particularly to a smoker attachment that can be mounted on known barbecue grills employing gas burners, electric heating elements or charcoal as a heat source.

BACKGROUND OF THE INVENTION

Smoker attachments are used in combination with outdoor barbecue grills to allow the grills to be used for smoking food products as well as grilling food products. The addition of smoker attachments increases the utility of outdoor grills and expands the variety of foods that can be prepared on a grill.

The utility of smoker attachments, for use on barbecue grills, has been recognized by a number of people. Smoker attachments have been proposed that are supported by the housing of a barbecue grill or that sit on the grill surface of a barbecue grill. Such smoker attachments can smoke meats and other food products successfully. However, the known smoker attachments have some disadvantages. They tend to remove moisture from the food product that is being cooked and smoked. They also subject the food product that is being smoked to undesirable smoke, odors and products of combustion.

Open containers of water are often placed inside smoker attachments to add steam to the inside of the smoker attachment and to the food product that is being smoked. Steam and excess moisture may make the food product soggy and may also remove some of the natural flavors from the food product. Water sprays have been provided for wetting wood chips to prevent wood chips from flaming up. The water spray has the same potential problems as steam from a water container in a smoker attachment. The rate at which moisture is added to the air inside the smoker attachment is difficult to control with either system for adding moisture. The rate of water evaporation from an open container can be controlled by moving the container toward the heat source or away from the heat source. To relocate such a water container, it is generally necessary to open known smoker attachments and let smoke and heat escape. The quantity of water supplied through a spray depends on the requirement to control wood chip burning rather than controlling the quantity of moisture in the air inside the smoker attachment.

Lava rocks may be used to distribute heat more evenly. While smoking a food product, drippings caught and held by the lava rocks over a period of time are reheated and produce smoke and vapors. This smoke and the vapors may impart foul odors and tastes to the food product being smoked. The products of combustion from a gas fire or from charcoal may also change the flavor of a food product that is being smoked. Some of these products of combustion may be harmful if ingested.

Smoker attachments developed in the past generally have a damper arrangement that allows some smoke to escape. Dampers are required to ensure the circulation of smoke throughout the smoking chamber and to control temperature. As a result of the smoke lost through the dampers, additional wood chips are needed to produce the excess smoke that is required.

SUMMARY OF THE INVENTION

An object of the invention is to provide a smoker attachment, for a barbecue grill, that has a substantially sealed smoking chamber. Another object of the invention is to provide a smoker attachment for a barbecue grill employing any one of several different heat sources. A further objection of the invention is to provide a smoker attachment for a barbecue grill that requires a minimal quantity of wood chips to provide the required smoke. A still further object of the invention is to provide a smoker attachment for a barbecue grill that has interior passages and baffles to ensure even distribution of smoke in a smoking chamber. A yet still further object of the invention is to provide a smoker attachment that minimizes heat loss.

The smoker attachment, for a barbecue grill, includes a smoker box with a solid bottom plate, left and right side walls, a back wall, a top and an open front. Left side and right side front doors are provided to open and close the open front. When the left and right side doors are closed and latched, the smoker box forms a substantially sealed compartment. Support brackets are attached to the smoker box to support the smoker attachment on the top surfaces of the walls of a barbecue grill box. The solid bottom plate is held a short distance above the heat source of the barbecue grill.

The smoker box is divided into a wood chip chamber and a smoking chamber by a smoke box divider plate. A wood chip box sits on the solid bottom plate in the wood chip chamber. Smoke passages are provided through the smoke box divider plate adjacent to the left and right side walls. A plurality of tray and rack holders are attached to the inside surfaces of the left side wall and the right side wall in the smoking chamber.

Tray and rack holders are attached to the side walls inside the smoking chamber. Smoke passage apertures are provided through the tray and rack holders adjacent to the left and right side walls. Trays and racks for holding food products to be cooked and smoked are supported in the smoking chamber by the tray and rack holders. Vertical baffles are attached to the tray and rack holders between the trays and racks and the smoke passage apertures through the tray and rack holders to ensure an even distribution of smoke throughout the smoking chamber.

BRIEF DESCRIPTION OF THE DRAWINGS

The presently preferred embodiments of the invention are disclosed in the following description and in the accompanying drawings, wherein.

DESCRIPTION OF THE PREFERRED EMBODIMENTS

Figure 1:
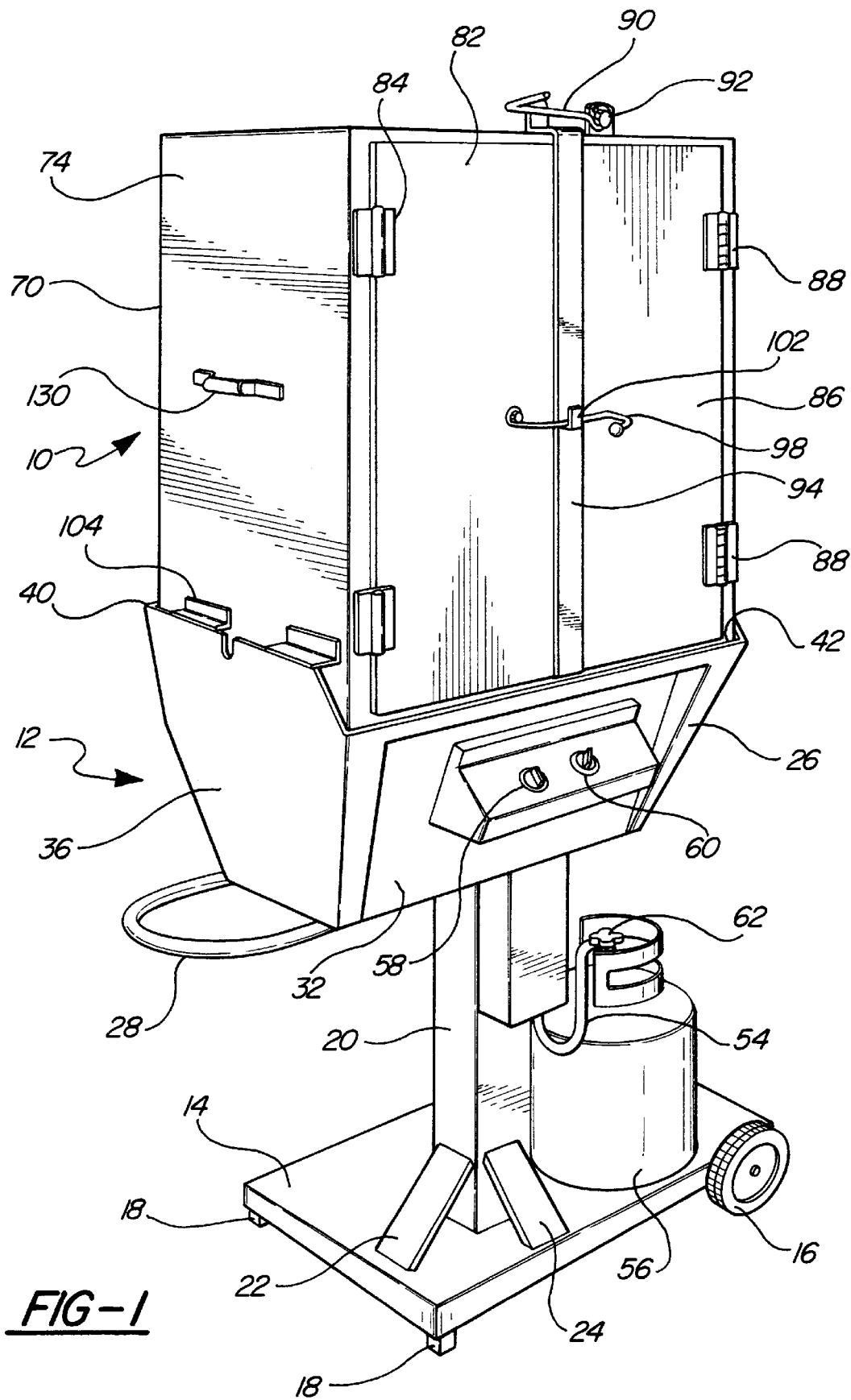
FIG. 1 is a perspective view of the smoking attachment setting on a barbecue grill with the lid of the barbecue grill removed.

The smoker attachment 10 is shown in FIG. 1 mounted on a portable barbecue grill 12. The barbecue grill 12 includes a base 14 with a pair of wheels 16 (only one is shown) supporting one end and a pair of fixed legs 18 supporting the other end. A tubular upright 20 extends vertically upward from the base 14. Brace members 22 and 24 provide a strong connection between the tubular upright 20 and the base 14. A grill box 26 is mounted on the top of the tubular upright 20. A U-shaped rod 28 extending horizontally from one end of the grill box 26 forms a handle that a person can grasp to lift the legs 18 and move the barbecue grill 12 on the wheels 16.

The grill box 26 has a grill bottom 30 attached to the tubular upright 20. A grill front wall 32, a grill rear wall 34 and grill end walls 36 and 38 are integral with the grill bottom 30 and with each other to form a grill box 26. The end walls 36 and 38 and the rear wall 34 have a common upper surface 40 that is in a horizontal plane. The grill front wall 32 has a horizontal upper surface 42 that is well below the upper surface 40 of the end walls 36 and 38.

The grill heat source includes two burner assemblies 44 and 46 supported in the grill box 26 above the grill bottom 30. Gas pipes 48, 50, 52 and 54 convey gas from a pressure tank 56 to the burners 44 and 46. One of the two control valves 58 and 60 controls the flow of gas from the pressure tank 56 to both burners 44 and 46 as shown. However, the pipes 48 and 50 could be connected so that the control valve 58 controls the flow of gas to the burner 44 and the control valve 60 controls the flow of gas to the burner 46. The valve 62 on the pressure tank 56 is used when replacing an empty pressure tank with a full pressure tank. The control valves 58 and 60 are capable of controlling the flow of gas from a natural gas pipeline as well as from a pressure tank 56 if the barbecue grill 12 is fixed rather than portable.

A grill rack 64 is mounted inside the grill box 26 directly above the burner assemblies 44 and 46. Lava rocks 66 are placed on the grill rack 64 to evenly distribute the heat produced by the gas that is burned after it passes through the gas apertures 68 in the burner assemblies 44 and 46. The lava rocks 66 are not required when using the smoker attachment 10 but can be used if desired.

The grill heat source could also be one or more electric coils or a charcoal bed. Electric coils can be controlled as well as gas burners 44 and 46 to control cooking and smoking temperatures. The temperature produced by a charcoal bed can be controlled by controlling the flow of oxygen through the charcoal bed. A charcoal bed would be on a charcoal grill rack (not shown) below the lava rock grill rack 64.

A grill rack for food is mounted in the grill box 26 above the lava grill rack 64 when the smoker attachment 10 is removed from the barbecue grill. When using the smoker attachment 10, the grill rack for food is removed from the grill box 26.

The barbecue grill 12 has a grill lid (not shown) that is attached to the grill rear wall 34 by hinges. When the smoker attachment 10 is used, the grill lid is removed from the grill box 26.

The smoker attachment 10 includes a smoker box 70 with a solid bottom plate 72. A left side wall 74 and a right side wall 76 are secured to the solid bottom plate 72. A rear wall 78 is secured to the solid bottom plate 72 and to the left and right side walls 74 and 76. A top 80 is connected to the left side wall 74, the right wall 76 and the rear wall 78.

A left side door 82 is pivotally connected to a left side wall 74 by hinges 84 and extends from the solid bottom plate 72 to the top 80. A right side door 86 is pivotally connected to the right side wall 86 by hinges 88 and extends from the solid bottom plate 72 to the top 80.

An upper latch bar 90 is pivotally attached to the top 80 by a bolt 92. When pivoted to a latched position, the upper latch bar 90 engages a vertical bar 94 and urges the vertical bar toward the rear wall 78. The vertical bar 94 has a horizontal offset section 96 that is above the top 80. The vertical bar 94 is welded to the right side door 86 and overlaps a vertical edge of the left side door 82. A lower latch bar 98 is pivotally attached to the left door 82 by a bolt 100. When pivoted into a latched position in the receiver member 102, the lower latch bar 98 urges the vertical bar 94 into sealing contact with the left door 82. The receiver member 102 is secured to the vertical bar 94 and the right side door 86. When the left door 82 and the right door 86 are both closed and the upper latch bar 90 and the lower latch bar 98 are both in a latched position, the smoker box 80 is essentially a sealed container. While small quantities of air and moisture can escape from the closed smoker box 70, the quantities of smoke and moisture that do escape are very small. If desired seals can be provided to further limit the escape of smoke and moisture. With doors 82 and 86 that fit well, seals are not generally required. It is not desirable to pressurize the smoker box 70. The cooking rate generally increases in a pressurized container making it difficult to determine how long to leave food products in the smoker box 70. The door or doors 82 and 86 of the smoker box 70 can take many forms. The primary requirements of the doors 82 and 86 are to close the open front side of the smoker box 70 and to be easy to open even when the smoker box 70 is in use.

Figure 2:
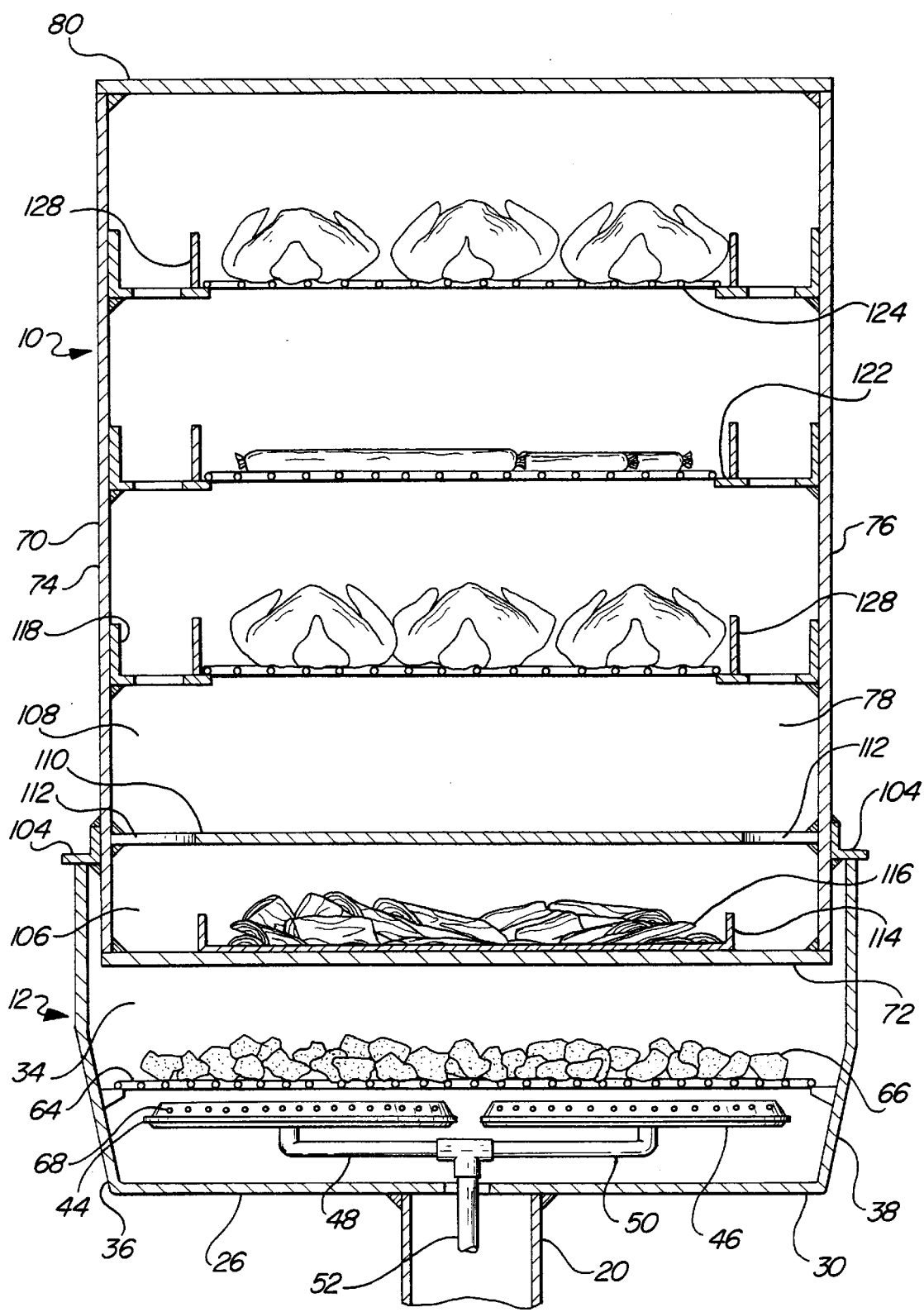
FIG. 2 is a vertical sectional view of the smoker attachment and an upper portion of the barbecue grill.
Figure 3:
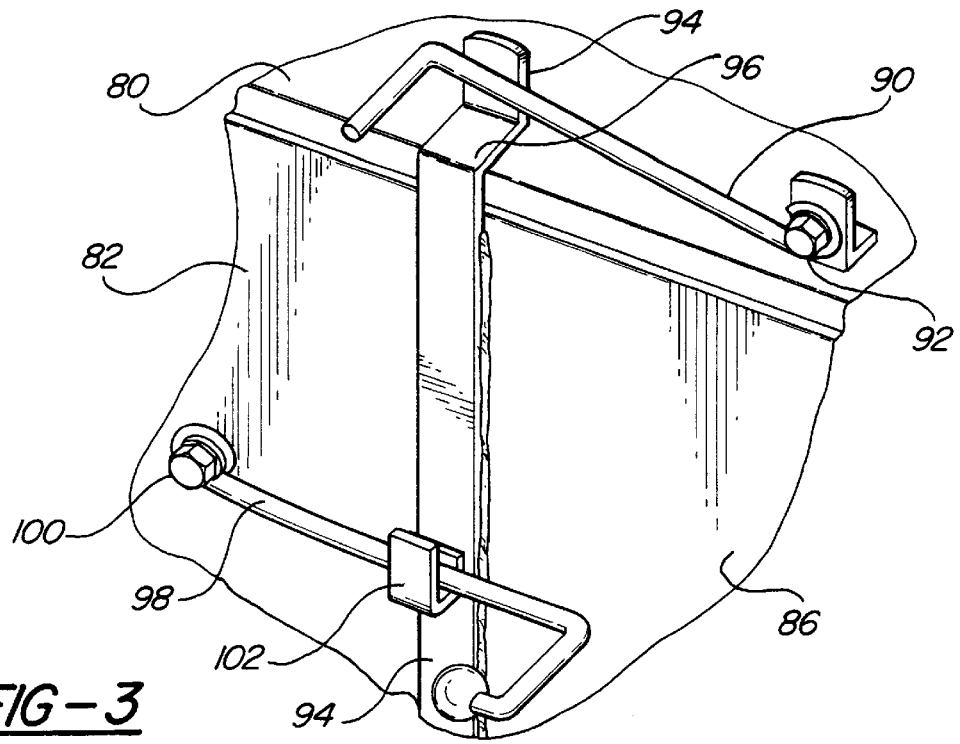
FIG. 3 is a perspective view of the latches for holding the doors closed.
Figure 4:
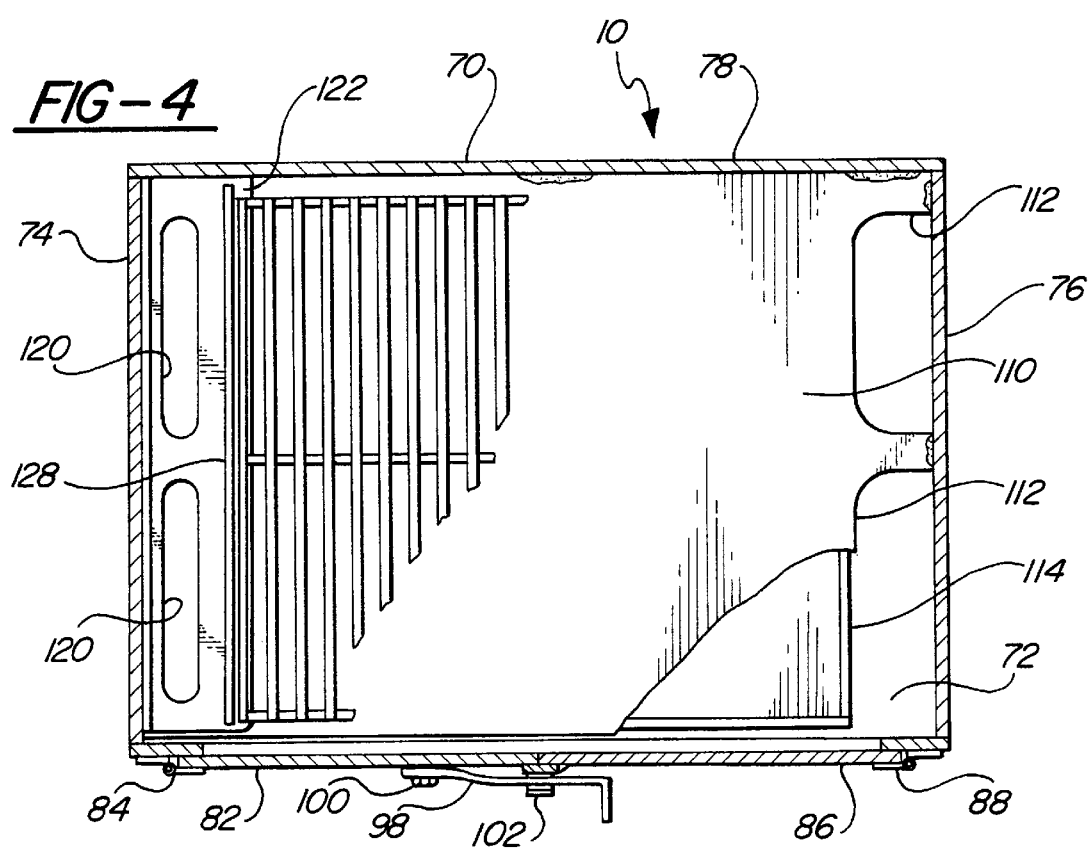
FIG. 4 is a top plan view of the smoker attachment with the top removed and parts broken away.

Support brackets 104, as shown in FIGS. 1 and 2, are angle members welded to the left side wall 74 and the right side wall 76. The support brackets 104 set on the top surfaces 40 of the grill end walls 36 and 38 and hold the solid bottom plate 72 in a position a short distance above the heat source and at about the same position as food when the food is cooked on the barbecue grill 12 without the smoker attachment 10. The grill front wall 32 is lower than the grill end walls 36 and 38 and the grill rear wall 34. This allows the left door 82 and the right door 86 of the smoker attachment 10 to open even when the solid bottom plate 72 is well below the upper surfaces 40 of the grill box 26. The support brackets 104 can be positioned and shaped to accommodate the grill box 26 of the barbecue grill 12 that is used. Support brackets 104 can also be attached to the rear wall 78 of the smoker attachment 10 and to the front portion of the solid bottom plate 72 if needed.

The smoker box 70 is divided into a wood chip chamber 106 and a smoking chamber 108 by a smoker box divider plate 110. The smoker box divider plate 110 is attached to the side walls 74 and 76 and the rear wall 78 by welding. Smoke passages 112 are provided through the smoker box divider plate 110 adjacent to the side walls 74 and 76.

A wood chip box 114 sits on the upper surface of the solid bottom plate 72 inside the wood chip chamber 106. Wood chips 116 are placed in the wood chip box 114. When the doors 82 and 86 are opened the box 114 can be removed for cleaning, new wood chips can be placed in the box, and the box can be placed back on the solid bottom plate 72 inside the wood chip chamber 106. If desired, wood chips 116 can be placed directly on the solid bottom plate 72. However, the employment of the wood chip box 114 makes cleaning substantially easier and it is easier to distribute the wood chips evenly across a portion of the wood chip chamber 106.

Tray and rack holders 118 are secured to the left side wall 74 and the right side wall 76 inside the smoking chamber 108 by welding. Each tray and rack holder 118 has smoke passage apertures 120 that are adjacent to a side wall 74 or 76 and directly above one of the smoke passages 112 through the smoke box divider plate 110. Each tray and rack holder 118 also has a tray and rack support surface 122. Racks 124 or trays 126 are supported on the tray and rack support surfaces 122. When the doors 82 and 86 are opened, trays 126 and racks 124 can be placed on and removed from the support surfaces 122 on the tray and rack holders 118.

Vertical smoke baffles 128 are secured to an upper surface of each tray and rack holder 118 between the tray and rack support surfaces 122 and the smoke passage apertures 120. The smoke baffles 128 extend from near the back wall 78 to near the door 82 or 86 and vertically from the tray and rack support surface to a level that is above most food products that are placed on an adjacent rack 124 or tray 126 to be smoked. The purpose of the smoke baffles 128 is to obtain a generally uniform temperature and smoke distribution throughout the smoking chamber 108. Without the baffles 128 meat on trays and racks adjacent to the smoke passage apertures 120 tends to be overcooked, dried out and over-smoked.

Handles 130 are secured to the outside surfaces of the side walls 74 and 76 for lifting the smoker attachment 10 from a barbecue grill 12. Handles 130 are also used to position the smoker attachment 10 on a barbecue grill 12 in preparation for smoking food products.

To operate the smoker attachment 10 and smoke food products, the lid of a barbecue grill 12 is removed and the upper food grill rack is removed, if necessary, to make room for the smoker attachment 10. Smoker attachment 10 is then positioned on top of the grill box 26 of the barbecue grill 12. The solid bottom plate 72 of the smoker attachment 10 is above the burner assemblies 44 and 46 at about the normal position of food products when they are cooked on the barbecue grill 12 without the smoker attachment 10. The doors 82 and 86 of the smoker box 70 are opened and a wood chip box 114 containing a bed of wood chips 116 is placed on the solid bottom plate 72 inside the wood chip chamber 106. The heat source burner assemblies 44 and 46 are turned on by turning controls 58 and 60 as required. Food products which are to be cooked and smoked are placed on racks 124 and trays 126, which are appropriate for the particular food product that they hold, and the racks and trays are positioned on the tray and rack holders 118 inside the smoking chamber 108 in the smoker box 70. The doors 82 and 86 are then closed and latched by the latch bars 90 and 98 thereby closing and sealing the smoker box 70.

When the food products are cooked and smoked as desired, the controls 58 and 60 are moved to an off position, the doors 82 and 86 are opened and the racks 124 and trays 126 with their food products are removed from the smoker box 70. Different food products are cooked and smoked at different rates. With the smoker attachment 10 described above, food products can be placed in the smoking chamber 108 at any time and removed at any time. It is also possible to add and remove food products with the heat source 44 and 46 adding heat to the smoker attachment 10. Wood chips 116 can also be added to the wood chip box 114 as required. After the smoker attachment 10 has cooled, the wood chip box 114 can be removed and cleaned. The smoker attachment 10 can be removed from the grill box 26 of the barbecue grill 12 or it can remain in place for future use.

The disclosed embodiments are representative of a presently preferred forms of the invention, but are intended to be illustrative rather than definitive thereof. The invention is defined in the claims.

I claim:

1. A smoker attachment for a grill having a grill box and a grill heat source comprising:

a smoker box with a solid bottom plate, at least one side wall, an opening in the at least one side wall and a top;

a door assembly for opening and closing the opening in the at least one side wall and sealing the smoker box;

a smoker box divider plate mounted inside the smoker box and forming a wood chip chamber between the solid bottom plate and the smoker box divider plate, and a smoking chamber between the smoker box divider plate and the top;

at least one smoke passage through the smoker box divider plate;

a pair of tray and rack holders mounted inside the smoking chamber;

a food product support rack supported by the tray and rack holders in the smoking chamber and removable from the smoking chamber when the door assembly is open; and at least one support bracket attached to the smoker box which contacts the grill box and positions the solid bottom plate of the smoker box above the grill heat source.

2. The smoker attachment as set forth in claim 1 wherein the pair of tray and rack holders are attached to the at least one side wall and have at least one smoke passage aperture through each tray and rack holder positioned above the at least one smoke passage through the smoker box divider plate.

3. The smoker attachment as set forth in claim 2 wherein each of the tray and rack holders has an attached vertical smoke baffle between the at least one smoke passage aperture and the food product support rack supported by the tray and rack holders.

4. The smoker attachment as set forth in claim 1 wherein the door assembly includes a first door pivotally attached to the smoker box, a second door pivotally attached to the smoker box, and at least one latch that holds the first door and the second door in closed positions and substantially seals the wood chip chamber and the smoking chamber.

5. The smoker attachment as set forth in claim 4 wherein the at least one latch can be released and the first door and the second door can be pivoted to an open position when the at least one support bracket is in contact with the grill box and the solid bottom plate is above the grill heat source.

6. The smoker attachment as set forth in claim 1 wherein the at least one side wall of the smoker box includes a rear wall, a left side wall, a right side wall, an open front, and the smoker box is rectangular.

7. The smoker attachment as set forth in claim 1 wherein a wood chip box sits inside the wood chip chamber on the solid bottom plate.

8. A smoker attachment for a grill having a grill box with a grill bottom, a grill front wall, a grill rear wall, two grill end walls, a grill heat source and a removable grill lid comprising:

a smoker box with a solid bottom plate, a left side wall connected to the bottom plate, a right side wall connected to the bottom plate, a rear wall connected to the bottom plate, the left side wall and the right side wall, a top connected to the left side wall, the right side wall and the rear wall;

a left side door pivotally connected to the left side wall and extending from the solid bottom plate to the top;

a right side door pivotally connected to the right side wall and extending from the solid bottom plate to the top;

at least one latch to latch the left side door and the right side door in a closed position in which the smoker box is closed and substantially sealed;

at least one support bracket attached to the left side wall, at least one support bracket attached to the right side wall, and wherein each of the support brackets rests on an upper surface of one of the grill end walls to support the solid bottom plate above the grill heat source;

a smoker box divider plate connected to the left side wall, the right side wall and the rear wall and positioned above and parallel to the solid bottom plate to form a wood chip chamber under the smoker box divider plate and a smoking chamber above the smoker box divider plate;

a wood chip container in the wood chip chamber supported by the solid bottom plate;

smoke passages through the smoker box divider plate adjacent to the left side wall and the right side wall, a plurality of tray and rack holders attached to the left side wall and the right side wall inside the smoking chamber, a food support rack supported by two of the tray and rack holders, at least one smoke passage aperture through each of the tray and rack holders adjacent to one of the side walls, vertical smoke baffles attached to an upper surface of the tray and rack holders between the smoke passage aperture and a tray and rack support surface on each tray and rack holder.

9. A method of smoking food products in a smoker attachment having a smoker box for a barbecue grill comprising:

positioning the smoker attachment on a grill box of the barbecue grill with a solid bottom plate of a smoker box portion of the smoker attachment above a grill heat source;

activating the grill heat source;

opening a door assembly of the smoker box;

placing wood chips inside a wood chip chamber in the smoker box;

placing a rack, with food products to be smoked, on a pair of tray and rack holders inside a smoking chamber in the smoker box;

closing the door assembly to substantially seal the wood chip chamber and the smoking chamber;

deactivating the grill heat source when the food products on the rack are ready to be removed from the smoking chamber;

opening the door assembly; and removing the rack with food products from the smoking chamber.

10. The method of smoking food products in a smoker attachment for a barbecue grill as set forth in claim 9 including:

opening the door assembly as required to add food products that require less time in the smoking chamber than the food products that are already in the smoking chamber and to add wood chips in the wood chip chamber; and closing the door assembly to substantially reseal the wood chip chamber and the smoking chamber.

* * * * *